US012474654B2

(12) United States Patent
Obana

(10) Patent No.: US 12,474,654 B2
(45) Date of Patent: Nov. 18, 2025

(54) IMAGE FORMING APPARATUS

(71) Applicant: Akimitsu Obana, Kanagawa (JP)

(72) Inventor: Akimitsu Obana, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 21 days.

(21) Appl. No.: 18/520,640

(22) Filed: Nov. 28, 2023

(65) Prior Publication Data

US 2024/0176266 A1 May 30, 2024

(30) Foreign Application Priority Data

Nov. 30, 2022 (JP) ................................ 2022-192306

(51) Int. Cl.
*G03G 15/00* (2006.01)
*G03G 15/20* (2006.01)
*G03G 21/20* (2006.01)

(52) U.S. Cl.
CPC ..... *G03G 15/2017* (2013.01); *G03G 15/2064* (2013.01); *G03G 21/206* (2013.01); *G03G 2215/20* (2013.01); *G03G 2221/1645* (2013.01)

(58) Field of Classification Search
None
See application file for complete search history.

(56) References Cited

U.S. PATENT DOCUMENTS 11,650,539 B2 * 5/2023 Ishida .................. G03G 21/206 399/92
2004/0234301 A1 * 11/2004 Sato ................... G03G 15/0194 399/302
2005/0232653 A1 * 10/2005 Murooka ............. G03G 21/206 399/92
2006/0024095 A1 * 2/2006 Suzuki ................... G03G 15/24 399/307
2007/0071485 A1 * 3/2007 Yuasa .................. G03G 21/206 399/92
2007/0212104 A1 * 9/2007 Miyamoto ........... G03G 21/206 399/302
2014/0376950 A1 * 12/2014 Hara .................... G03G 21/206 399/92
2015/0153686 A1 6/2015 Tanaka et al.
2016/0274537 A1 * 9/2016 Yamashita ........... G03G 21/206
(Continued)

FOREIGN PATENT DOCUMENTS

JP 59013266 A * 1/1989
JP H08-063084 A 3/1996
(Continued)

*Primary Examiner* — Sevan A Aydin
(74) *Attorney, Agent, or Firm* — XSENSUS LLP

(57) ABSTRACT

An image forming apparatus includes an image forming device, a container, a thermal fixing device, and a duct. The image forming device forms an image on a sheet with an image forming substance. The container is separate from the image forming device and stores the image forming substance to be supplied to the image forming device. The thermal fixing device applies heat and pressure to the image forming substance to fix the image on the sheet. The duct guides air to flow upward through a first region between an outer circumference of the image forming device and an outer circumference of the container and a second region adjacent to an outer circumference of the thermal fixing device.

13 Claims, 8 Drawing Sheets

(56) References Cited

U.S. PATENT DOCUMENTS

| | | | | |
|---|---|---|---|---|
| 2016/0291541 | A1* | 10/2016 | Yamashita | G03G 21/206 |
| 2018/0246445 | A1* | 8/2018 | Yamashita | G03G 15/2064 |
| 2019/0227478 | A1 | 7/2019 | Kikura et al. | |
| 2019/0324388 | A1* | 10/2019 | Naruse | G03G 15/161 |
| 2019/0384216 | A1* | 12/2019 | Yoshioka | G03G 15/2017 |
| 2020/0103788 | A1* | 4/2020 | Furukawa | G03G 15/0868 |
| 2020/0103823 | A1 | 4/2020 | Tanaka et al. | |
| 2020/0133195 | A1 | 4/2020 | Ohta et al. | |
| 2021/0191297 | A1* | 6/2021 | Yamaguchi | G03G 15/6573 |
| 2023/0266707 | A1 | 8/2023 | Obana | |

FOREIGN PATENT DOCUMENTS

| | | | | | |
|---|---|---|---|---|---|
| JP | H11-282327 | A | | 10/1999 | |
| JP | 2000-098858 | A | | 4/2000 | |
| JP | 2001-194973 | A | | 7/2001 | |
| JP | 2008-292895 | A | | 12/2008 | |
| JP | 2011242635 | A | * | 12/2011 | |
| JP | 2016-080785 | A | | 5/2016 | |
| JP | 2019-101172 | A | | 6/2019 | |
| JP | 2020173432 | A | * | 10/2020 | G03G 15/081 |
| JP | 2021-139940 | A | | 9/2021 | |
| KR | 101129000 | B1 | * | 3/2012 | |

* cited by examiner

IMAGE FORMING APPARATUS

CROSS-REFERENCE TO RELATED APPLICATION

This patent application is based on and claims priority pursuant to 35 U.S.C. § 119(a) to Japanese Patent Application No. 2022-192306, filed on Nov. 30, 2022, in the Japan Patent Office, the entire disclosure of which is hereby incorporated by reference herein.

BACKGROUND

Technical Field

Embodiments of the present disclosure relate to an image forming apparatus.

Background Art

Various image forming apparatuses are known that include an image forming device that forms an image using an image formation substance, a container that is separated from the image forming device and contains an image-forming substance to be supplied to the image forming device, and a thermal fixing device. For example, a typical image forming apparatus in the art includes a suction member that sucks toner (image-forming substance) scattering from an image forming unit (i.e., an image forming device), a toner remover disposed in the middle of an air exhaust passage connecting the image forming unit and the suction member, and a flow-rectifying duct that is disposed downstream from the suction member in the sheet conveyance direction to blow air sucked by the suction member, to a toner cartridge area where a toner cartridge (i.e., a container) is disposed. The image forming apparatus in the art also includes a first air flowing passage and a second air flowing passage. The first air flowing passage is formed between and defined by an ejection tray and the toner cartridge to pass air through from the flow-rectifying duct. The second air flowing passage is continued from the first air flowing passage and is formed between and defined by a fixing device and the toner cartridge to guide the air passing through the first air flowing passage to the outside of the image forming apparatus. In other words, the second air flowing passage is formed between the fixing device and the image forming unit disposed below the fixing device.

In the image forming apparatus in the art, the air passing through the second air flowing passage between the fixing device and each of the toner cartridge and the image forming unit can shield (prevent) the toner cartridge and the image forming unit from heat generated by the fixing device. However, the second liquid flowing passage specifically disclosed extends horizontally or partially vertically downward, and there is room for enhancement in terms of energy efficiency for generating an air flow. Accordingly, an object of the present disclosure is to increase energy efficiency for generating an air flow to shield an image-forming substance container and the image forming device from heat of a fixing device as compared with image forming apparatuses in the related art.

SUMMARY

Embodiments of the present disclosure described herein provide a novel image forming apparatus including an image forming device, a container, a thermal fixing device, and a duct. The image forming device forms an image on a sheet with an image forming substance. The container is separate from the image forming device and stores the image forming substance to be supplied to the image forming device. The thermal fixing device applies heat and pressure to the image forming substance to fix the image on the sheet. The duct guides air to flow upward through a first region between an outer circumference of the image forming device and an outer circumference of the container and a second region adjacent to an outer circumference of the thermal fixing device.

BRIEF DESCRIPTION OF THE SEVERAL VIEWS OF THE DRAWINGS

A more complete appreciation of embodiments of the present disclosure and many of the attendant advantages and features thereof can be readily obtained and understood from the following detailed description with reference to the accompanying drawings, wherein.

Figure 1A:
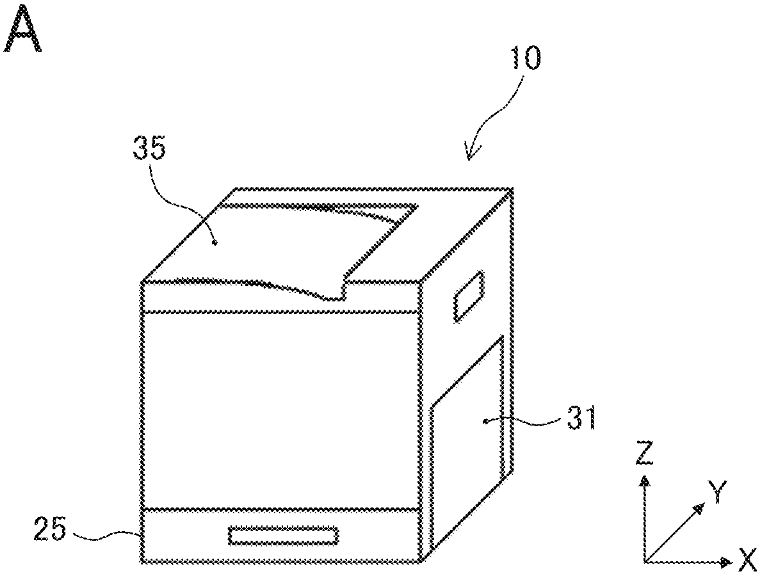
FIGS. 1A and 1B are perspective views of a monochrome laser printer, each illustrating the exterior of the monochrome laser printer as an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. As used herein, the term "connected/coupled" includes both direct connections and connections in which there are one or more intermediate connecting elements. Like numbers refer to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. As used herein, the singular forms "a," "an," and "the" are intended to include the plural forms as well, unless the context clearly indicates otherwise.

Image Forming Process in Image Forming Apparatus

A description is given of an image forming apparatus according to an embodiment of the present disclosure with reference to the drawings attached.

Elements (for example, mechanical parts and components) having the same functions and shapes are denoted by the same reference numerals throughout the specification and redundant descriptions are omitted.

In the above description, the term "image forming apparatus" means an apparatus that performs image formation by making image formation and ink adhere to a sheet that is a recording medium to record an image. Image-forming substance includes toner and ink as developer but is not limited to toner and ink. Further, the term "image formation" indicates an action for providing (i.e., printing) not only an image having meanings such as texts and figures on a recording medium but also an image having no meaning such as patterns on a recording medium. The term "sheet" is not limited to paper (paper sheet) and includes, for example, an overhead projector (OHP) sheet, and cloth, and indicates a medium or a document to which a developer or ink can be made to adhere. In addition, the term "sheet" is not limited to a flexible sheet such as a plain paper but also is applicable to a rigid plate-shaped sheet and a relatively thick sheet such as thick paper, post card, envelope, thin paper, coated paper, art paper, and tracing paper. Further in the following embodiments, the "sheet" indicates a paper, the "toner" indicates developer, and size (dimension), material, shape, and relative positions used to describe each of the components and units are examples, and the scope of this disclosure is not limited thereto unless otherwise specified.

Figure 1B:
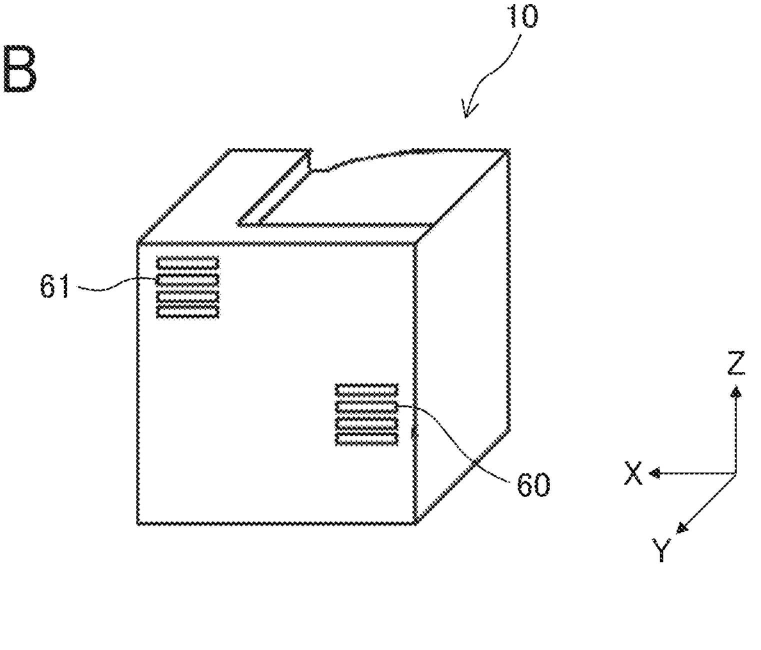

FIGS. 1A and 1B are perspective views of a monochrome laser printer 10, each illustrating the exterior of the monochrome laser printer 10 as an image forming apparatus according to an embodiment of the present disclosure.

The monochrome laser printer 10 is referred to as a "printer 10". FIG. 1A is a perspective view of the printer 10 viewed from the front side and FIG. 1B is a perspective view of the printer 10 viewed from the rear side. An ejection tray 35 is disposed at the upper part of the printer 10. A sheet tray 25 is disposed at the lower part of the printer 10. A bypass sheet tray 31 is disposed on the right-side face of the printer 10. An air inlet port 60 and an air outlet port 61 are formed in the rear side face of the printer 10.

Initially, a description is given of the configuration of the printer 10.

Figure 2A:
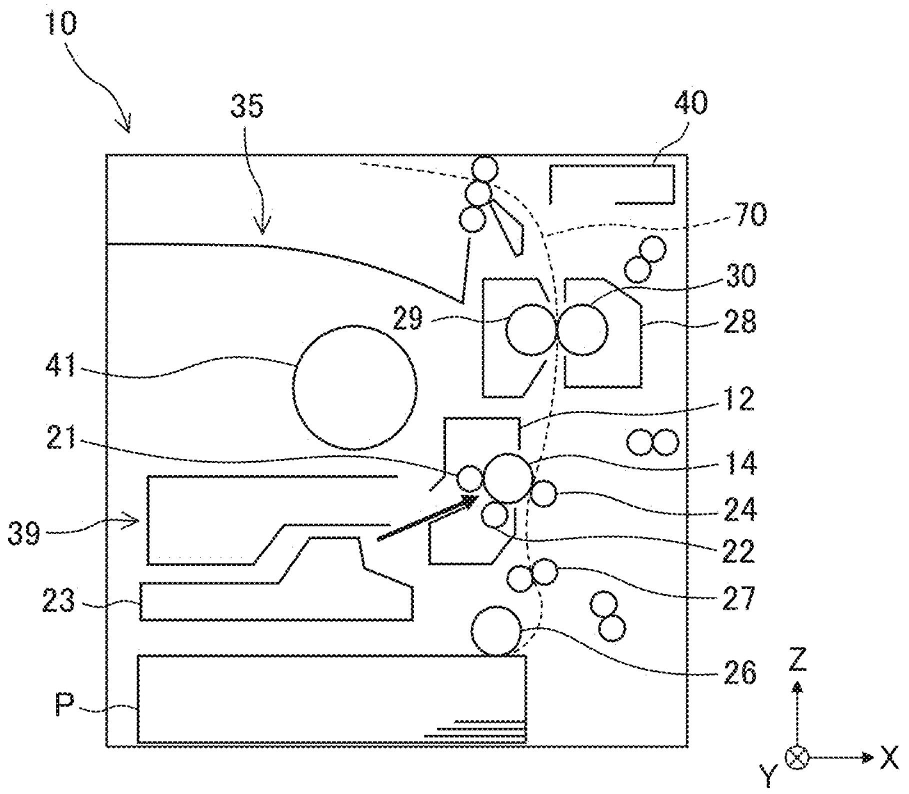
FIGS. 2A and 2B are diagrams, each illustrating a schematic internal configuration of the monochrome laser printer.
Figure 2B:
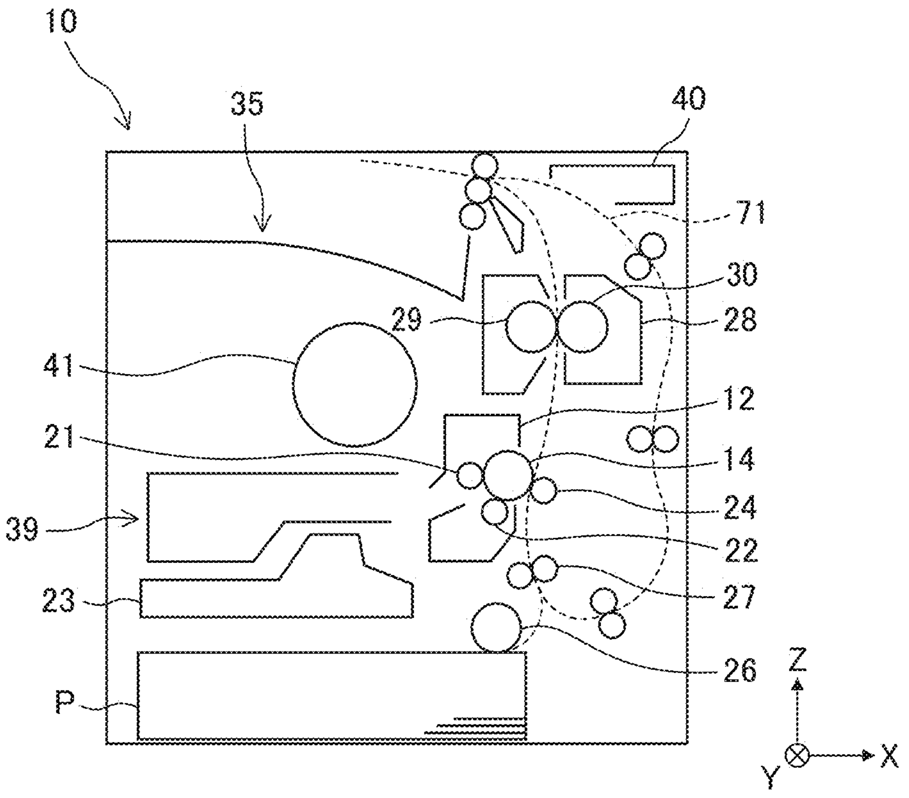

FIGS. 2A and 2B are diagrams, each illustrating a schematic internal configuration of the printer 10.

FIG. 2A illustrates a first conveyance passage 70 that is a passage in which a sheet with an image on the first face, in a broken line.

A sheet passes through the conveyance passage 70 in a single-sided printing or a duplex printing.

FIG. 2B illustrates a second conveyance passage 71 that is a passage in which a sheet with respective images on both the first and second faces, in a broken line.

A sheet passes through the second conveyance passage 71 in the duplex printing.

The printer 10 includes an image forming device 50 including a process unit 12 that forms an image with black developer. The process unit 12 includes a photoconductor 14 (i.e., a photoconductor drum), a charging unit 21, and a developing unit 22. The photoconductor 14 serving as an image bearer bears an image on the surface. The charging unit 21 serving as a charger uniformly charges the surface of the photoconductor 14. The developing unit 22 serving as a developing unit supplies toner serving as developer on the photoconductor 14 to form an image (i.e., a developer image) on the photoconductor 14.

The process unit 12 further includes a drum cleaning unit, a waste toner container, and a charge neutralizer. The drum cleaning unit serving as a cleaner cleans the surface of the photoconductor 14. The waste toner container contains toner (waste toner) removed by cleaning. The charge neutralizer electrically discharges (neutralizes) the surface of the photoconductor 14. Unused toner is contained in the developing unit 22. The process unit 12 is detachably attached to the housing of the printer 10 so that the consumable parts included in the process unit 12 can be replaced. The process unit 12 according to the present embodiment is a unit including a photoconductor and at least a charging unit and a developing unit. However, the combination of components to be included in the process unit 12 is not limited to the above-described combination.

A Laerdal suction unit (LSU) 23 is disposed at a lower left position from the process unit 12 in FIG. 1. The LSU 23 exposes the surface of the photoconductor 14 by light. The LSU 23 emits light to the surface of the photoconductor 14 based on image data. The printer 10 further includes a transfer roller 24 serving as a transfer member to transfer the image on the photoconductor 14 onto a sheet. The transfer roller 24 is disposed at a position contactable with the photoconductor 14 and forms a transfer nip region with the photoconductor 14 at the contact portion at which the transfer roller 24 and the photoconductor 14 contact with each other.

The printer 10 further includes a tray feed roller 26 serving as a sheet feeder to feed a sheet stacked on the sheet tray 25 (see FIGS. 1A and 1B). The printer 10 is also provided with a bypass sheet feed roller serving as a sheet feeder to feed a sheet P stacked on a bypass sheet tray 31 (see FIG. 1A) disposed on a side face of the printer 10. The printer 10 further includes a timing roller pair 27 downstream from the timing roller pair 27 and the bypass sheet feed roller and upstream from the transfer nip region in the sheet conveyance direction. The timing roller pair 27 temporarily stops the sheet P fed by these sheet feed rollers to convey the sheet P at a given timing.

The printer 10 further includes a fixing device 28 downstream from the transfer nip region in the sheet conveyance direction to fix the image transferred on the sheet P. The fixing device 28 includes a fixing roller 29 and a pressure roller 30. The fixing roller 29 includes a heat source such as a halogen lamp. The pressure roller 30 rotates while contacting the fixing roller 29 with a given pressure.

A description is now given of the basic operations of the printer 10 according to the present embodiment.

When a sheet P is fed from the sheet tray 25, as the tray feed roller 26 rotates in response to a sheet conveyance signal issued by a controller of the printer 10, the uppermost sheet P placed on top of the bundle of sheets P stacked on the sheet tray 25 is separated from the other sheets in the bundle of sheets P, so that the uppermost sheet P alone is fed and conveyed to the sheet conveyance passage toward the timing roller pair 27.

When a sheet P is fed from the bypass sheet tray 31, the bypass sheet feed roller rotates in response to a sheet conveyance signal issued by the controller of the printer 10, which is similar to the operation for conveying a sheet P from the sheet tray 25. As the bypass sheet feed roller rotates as described above, the uppermost sheet P placed on top of the bundle of sheets P stacked on the bypass sheet tray 31 is separated, so that the uppermost sheet P alone is fed and conveyed to the sheet conveyance passage. When the leading end of the sheet P reaches the nip region of the timing roller pair 27, the sheet P stands by while being bent (warped) in order to be timed (synchronized) with movement of the toner image formed on the photoconductor 14 and to correct skew at the leading end of the sheet P.

A description is given of the basic image forming operations of the printer 10.

Initially, the charging unit 21 uniformly charges the surface of the photoconductor 14 by supplying a high electric potential at the surface of the photoconductor 14. Based on image data obtained by an image reading device or an external computer, light is emitted from the LSU 23 to the charged surface of the photoconductor 14, so that the electric potential at the emitted portions on the surface of the photoconductor 14 decreases to form an electrostatic latent image. The developing unit 22 supplies toner to the electrostatic latent image formed on the photoconductor 14, forming (i.e., developing) a toner image (i.e., a developer image).

After the toner image is formed on the surface of the photoconductor 14, the rollers including the timing roller pair 27 and the tray feed roller 26 start rotating, so that the sheet P is conveyed to the transfer nip region at the same timing as (in synchrony with) movement of the toner image on the photoconductor 14. The transfer roller 24 transfers the toner image on the photoconductor 14 onto the sheet P conveyed by the above-described rollers. Residual toner remaining on the photoconductor 14 without being transferred onto the sheet P is removed by the drum cleaning unit. Then, the charge neutralizer electrically discharges the surface of the photoconductor 14.

The sheet P on which the transferred toner image is formed passes through the post-transfer sheet conveyance passage to the fixing device 28. The sheet P that is conveyed to the fixing device 28 is nipped between the fixing roller 29 and the pressure roller 30. Thus, the unfixed toner image on the sheet P is fixed to the sheet P by application of heat and pressure. The sheet P with the fixed toner image is conveyed from the fixing device 28 to the ejection tray 35.

A description is now given of a configuration of the printer 10 for cooling the toner bottle 41 and the process unit 12, according to the present embodiment.

Figure 3:
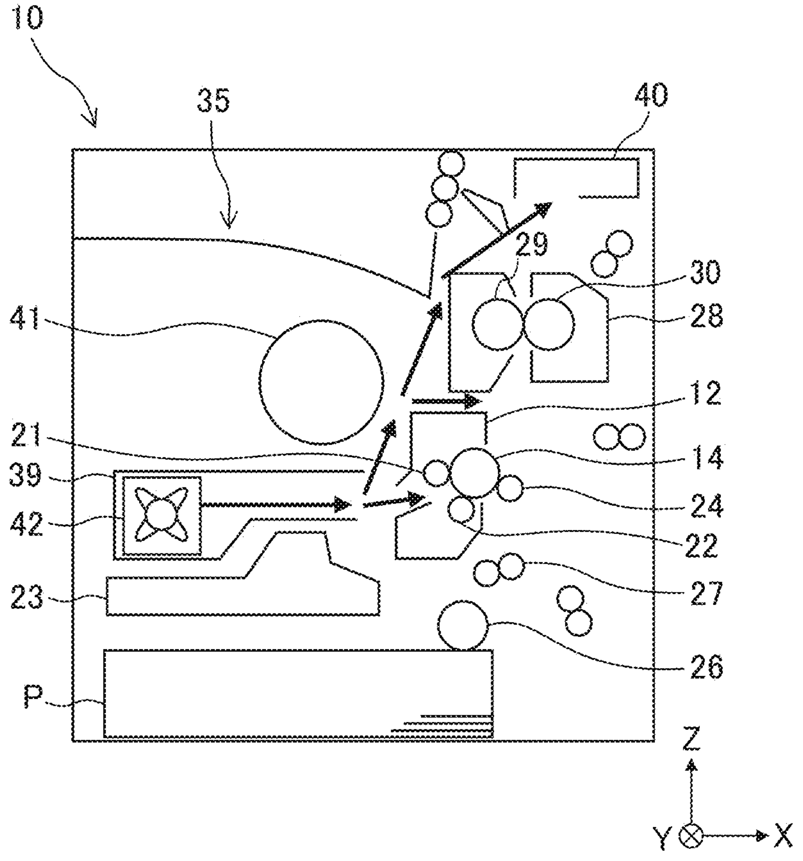
FIG. 3 is a diagram illustrating air flow for cooling the monochrome laser printer.

FIG. 3 is a diagram illustrating air flow for cooling the monochrome laser printer 10 according to the present embodiment.

The arrows in FIG. 3 represent air flow in the printer 10. As illustrated in FIG. 3, the process unit 12 is disposed below the fixing device 28. The toner bottle 41 is disposed on the left side of the fixing device 28 in FIG. 3.

Further, a first duct 39 is disposed below the toner bottle 41 in FIG. 3. A first fan 42 is disposed on the upstream side of the first duct 39 in the air flowing direction for taking air from the outside of the printer 10. The air taken by the first fan 42 passes through the first duct 39 and is blown out from the first openings 46*a* to 46*e* provided in the first duct 39.

Figure 4:
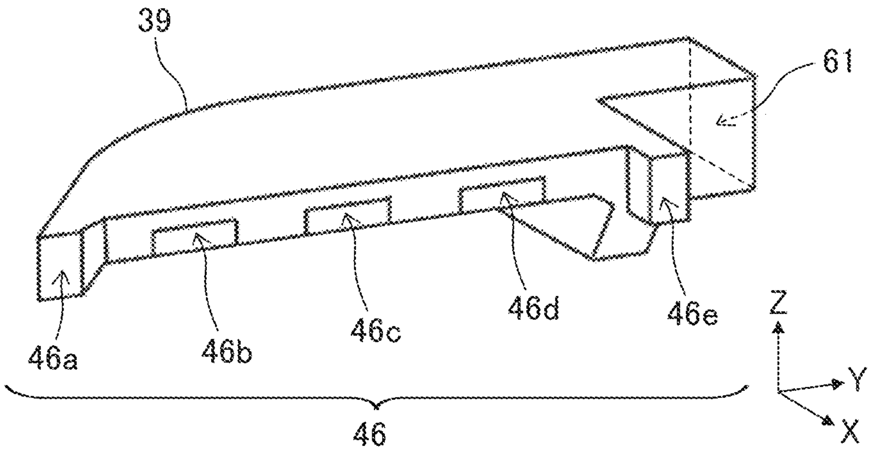
FIG. 4 is a perspective view of a first duct.

FIG. 4 is a perspective view of the first duct 39.

A bearing at an end of each roller of the process unit 12 is a sliding portion, and the temperature of the process unit 12 rises due to friction at the sliding portion. In the case of direct transfer to the photoconductor 14 in duplex printing, a high-temperature sheet P that has once passed the fixing device 28 contacts the photoconductor 14, so that the temperature of the photoconductor 14 rises. The temperature of the photoconductor 14 also rises due to the friction of the cleaning blade. Rise of the temperature of the process unit 12 causes toner to adhere to the process unit 12, resulting in damage on the process unit 12 or abnormal condition in image.

The air blown through the first openings 46*a* to 46*e* of the first duct 39 is blown to the outer circumference of the process unit 12. By so doing, an increase in temperature of the process unit 12 is reduced or prevented.

Figure 5:
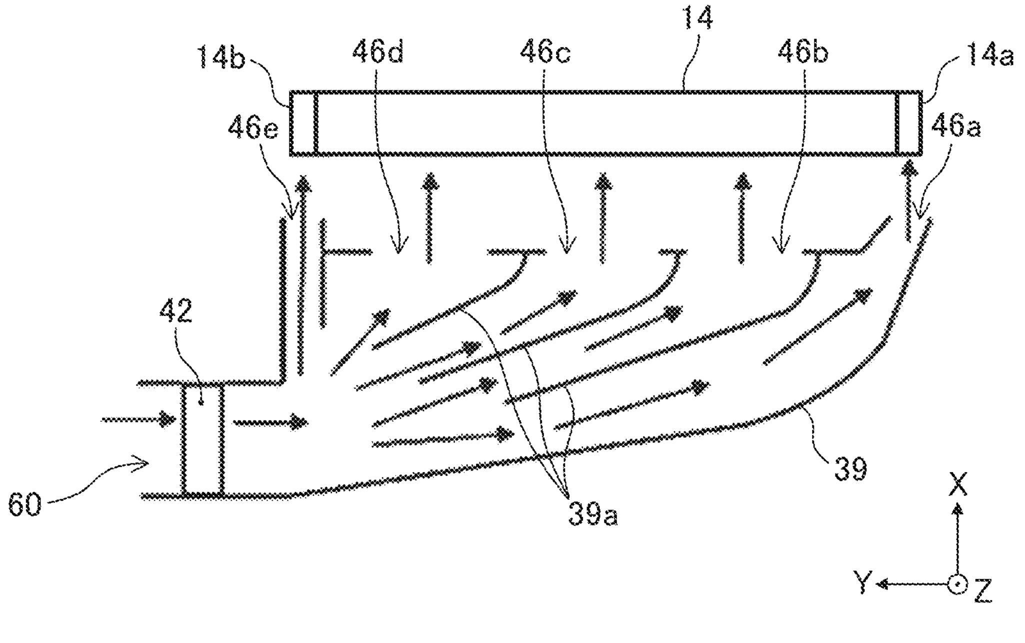
FIG. 5 is a plan view of the first duct and a photoconductor indicating the relative positions.

FIG. 5 is a plan view of the first duct 39 and the photoconductor 14, indicating the relative positions.

The first duct 39 has multiple first openings 46 (i.e., the first openings 46*a* to 46*e*). The first openings 46*a* and 46*e* at both ends of the first duct 39 are disposed facing the end portions (i.e., the bearing portions) of the process unit 12. In the drawing, the air from the first openings 46*a* and 46*e* is directed to the end portions 14*a* and 14*b* of the photoconductor 14, as illustrated with arrows. The first openings 46*b*, 46*c*, and 46*d* at the center portion of the first duct 39 are disposed facing the outer circumference of the photoconductor 14 and the outer circumference of the process cartridge 12. In the drawing, the air from the first openings 46*b*, 46*c*, and 46*d* is indicated with arrows.

Since the sheet P (at the installation environment temperature) in the sheet tray 25 and the sheet P (at the high temperature) having passed through the fixing device 28 alternately come into contact with the photoconductor 14, the rise in the temperature of the bearing portion where friction is constantly generated at the time of printing tends to be higher than the rise in temperature of the photoconductor 14. Accordingly, as the amount of air blow from the first openings 46*a* and 46*e* at the ends of the first duct 39 increases, the process unit 12 can be cooled more efficiently.

Any amount of amount of air can be blown by adjusting the shape of the passage in the first duct 39 (i.e., the ratio of the cross-sectional area of the passage) and the size and number of the first openings 46. The amount of air to be blown can be changed in accordance with a temperature increasing area of, for example, the process unit 12, the toner bottle 41, and the fixing device 28. For example, in the temperature rise evaluation, when the temperature does not increase so high in the center area of the process unit 12 and the temperature increases in the end areas so high that needs more cooling, the opening areas of the center openings (i.e., the first openings 46*b*, 46*c*, and 46*d*) are reduced to increase the resistance of the air flow and increase the flow rate to the end openings (the first openings 46*a* and 46*e*).

By changing the position of the rib 39*a* that forms the flow passage inside the first duct 39, reducing the cross-sectional area of the flow passage coupled to the center openings (i.e., the first openings 46*b*, 46*c*, and 46*d*), and increasing the cross-sectional area of the flow passage coupled to the end openings (i.e., the first openings 46*a* and 46*e*), the flow rate of air from the center openings (i.e., the first openings 46*b*, 46*c*, and 46*d*) can be reduced, and the flow rate of air from the end openings (i.e., the first openings 46*a* and 46*e*) can be increased.

Figure 6:
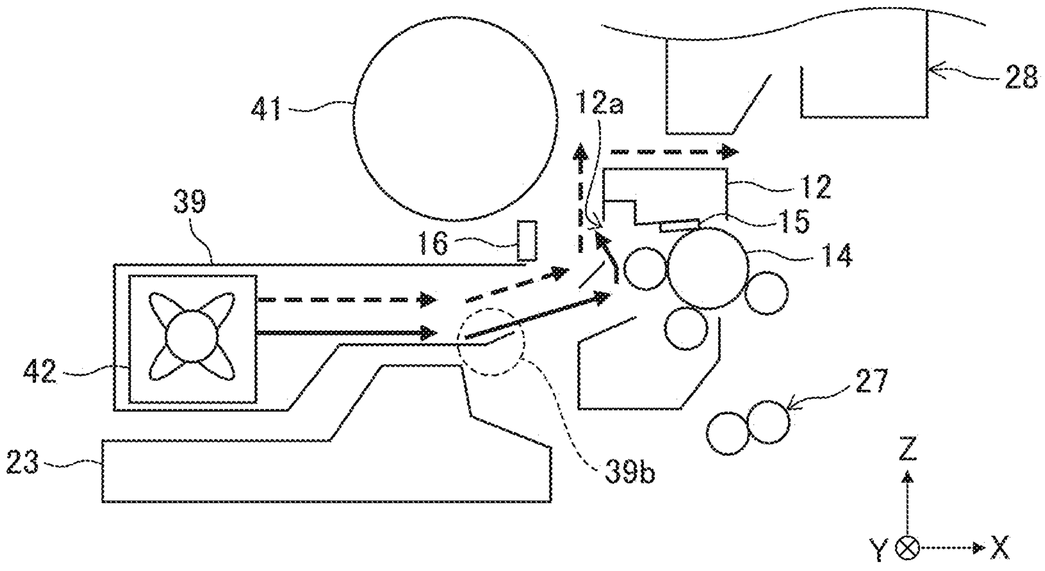
FIG. 6 is a diagram illustrating a first duct according to a modification.

FIG. 6 is a diagram illustrating a first duct according to a modification.

Figure 7:
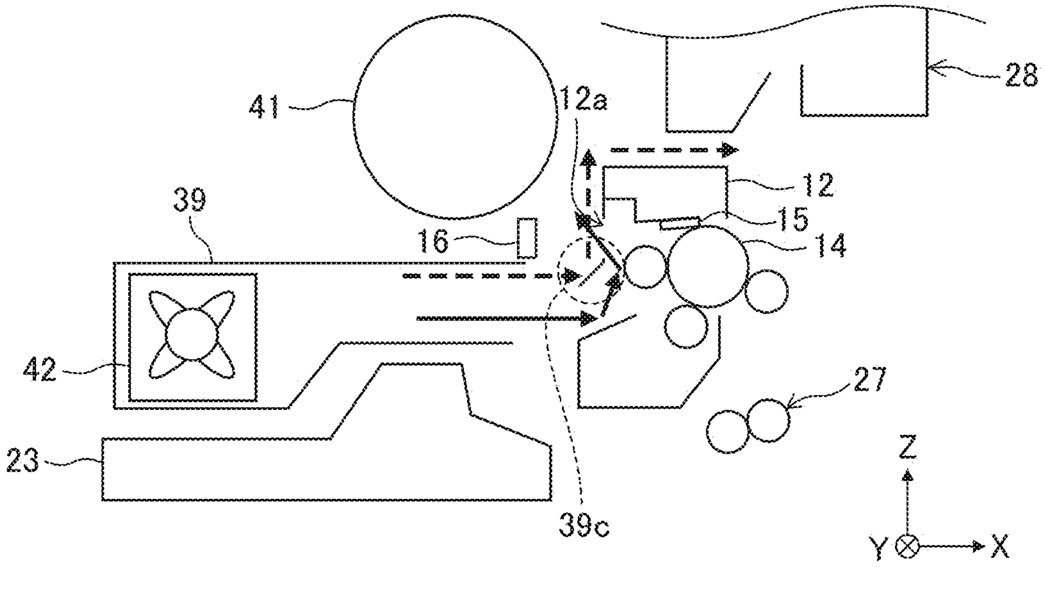
FIG. 7 is a diagram illustrating a case of a process unit according to a modification.

FIG. 7 is a diagram illustrating a case of a process unit according to a modification.

As illustrated in FIGS. 6 and 7, the airflow blown out from the first duct 39 is branched into air for cooling the inside of the process unit 12 (indicated by a solid arrow in the drawings) and air passing between the process unit 12 and the toner bottle 41 toward the fixing device 28 (upward in the drawings) (indicated by a broken arrow in the drawings). As illustrated in FIG. 6, the air flowing toward the fixing device 28 is generated by using a slope 39*b* provided at the openings of the first duct 39. As illustrated in FIG. 7, the air flowing vertically upward in the drawing is generated by using a slope 39*c* provided on the external side of the case of the process unit 12.

As illustrated in FIGS. 6 and 7, the air entering the process unit 12 is guided by the cleaning blade 15 and the folder of the cleaning blade 15 to flow upward, and merges with the air going out of the process unit 12 via the opening 12*a* through which light of the electricity discharging lamp 16 is transmitted toward the fixing device 28.

As illustrated in FIG. 3, the air flowing toward the fixing device 28 passes between the fixing device 28 having the outer circumference of the vertical face covering the heating roller in the fixing device 28 and the outer circumference of the cylindrical toner bottle 41. By so doing, the air efficiently passes through the outer circumference of the fixing device 28 and the temperature rise of the toner bottle 41 due to the heat caused in the fixing operation is reduced or prevented.

As illustrated in FIGS. 6 and 7, a part of the air directed toward the fixing device 28 (the upper parts of the drawings) passes through the gap between the upper portion of the process unit 12 and the lower portion of the fixing device 28. The air that has passed through this gap flows upward through a gap between the members defining the second conveyance passage 71 in which a sheet having respective images on both sides in the duplex printing. Specifically, the second conveyance passage 71 runs on the right side of the fixing device 28 in FIG. 2B. Then, the air is sucked into the second openings of the second duct 40 that is disposed vertically above the fixing device 28, which will be described below.

Figure 8:
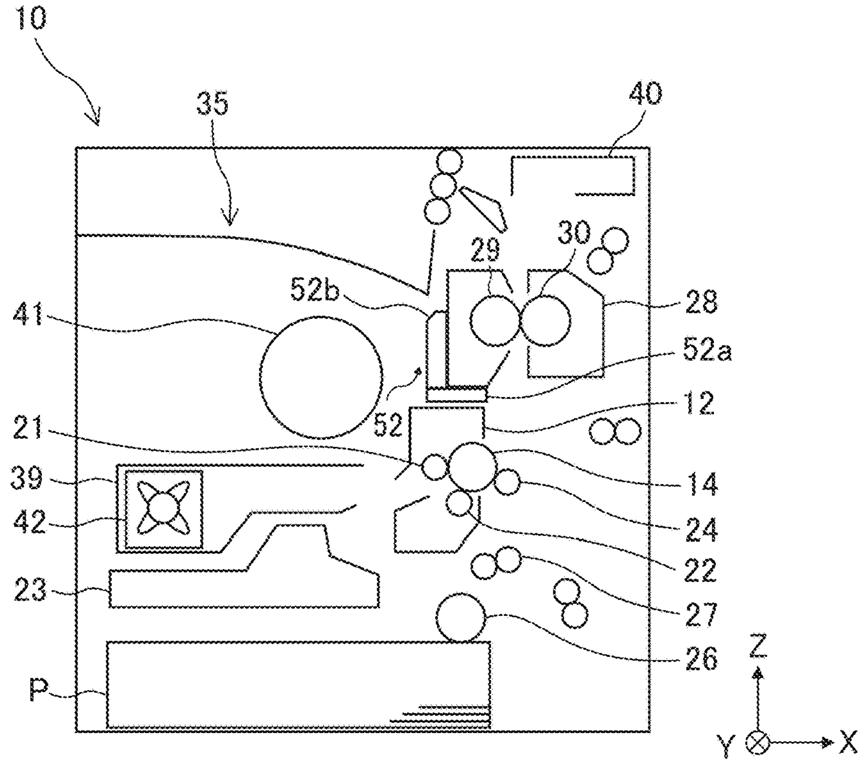
FIG. 8 is a diagram illustrating a configuration of a monochrome laser printer using a heat insulator.

FIG. 8 is a diagram illustrating a configuration of a monochrome laser printer using a heat insulator.

As illustrated in FIG. 8, heat insulation layers 52 may be disposed between the fixing device 28 and the toner bottle 41 or the process unit 12. The heat insulation layers 52 includes a first heat insulation layer 52*a* and a second heat insulation layer 52*b*. By disposing the heat insulation layer, the temperature rise of the toner bottle 41 and the process unit 12 due to the heat caused by the fixing operation is further reduced. The heat insulation layer is formed of an air layer surrounded by a heat insulating material such as sponge or a resin component. By providing the heat insulation layer serving as a heat insulator in the vicinity of the fixing device 28 as illustrated in FIG. 8, the range of diffusion of the heat caused by the fixing operation is limited to reduce the temperature rise in the entire apparatus. In addition, since the toner bottle 41 and the process unit 12 are detachably attached to the printer 10, a user accidentally may put the hand into the apparatus after attaching and detaching the toner bottle 41 or the process unit 12 and touch the metal plate heated due to the heat caused by the fixing operation, which can burn the hand. However, the heat insulation layer 52 prevents the metal plate from being heated to a high temperature and prevents the hand of the user from being accidentally put into the apparatus to result in burning the hand.

Figure 9:
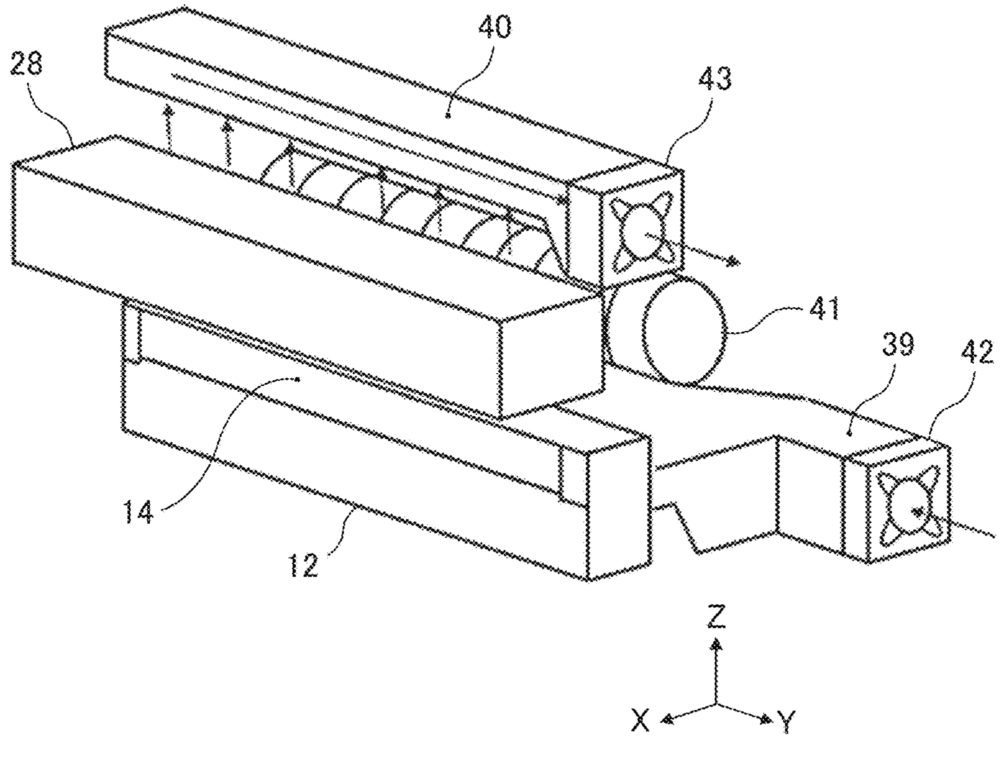
FIG. 9 is a perspective view of the first duct and a second duct for air exhaust indicating the relative positions.

FIG. 9 is a perspective view of the first duct 39 and a second duct 40 for air exhaust, indicating the relative positions.

As illustrated in FIGS. 3 and 9, the second duct 40 is disposed above the fixing device 28. A second fan 43 is disposed on the downstream side of the second duct 40 in the air flowing direction for exhausting air to the outside of the printer 10. The air that has passed between the fixing device 28 and the toner bottle 41 and the fixing heat are taken into the second openings 47 formed in the second duct 40 and is exhausted from the second fan 43 through the second duct 40.

Figure 10:
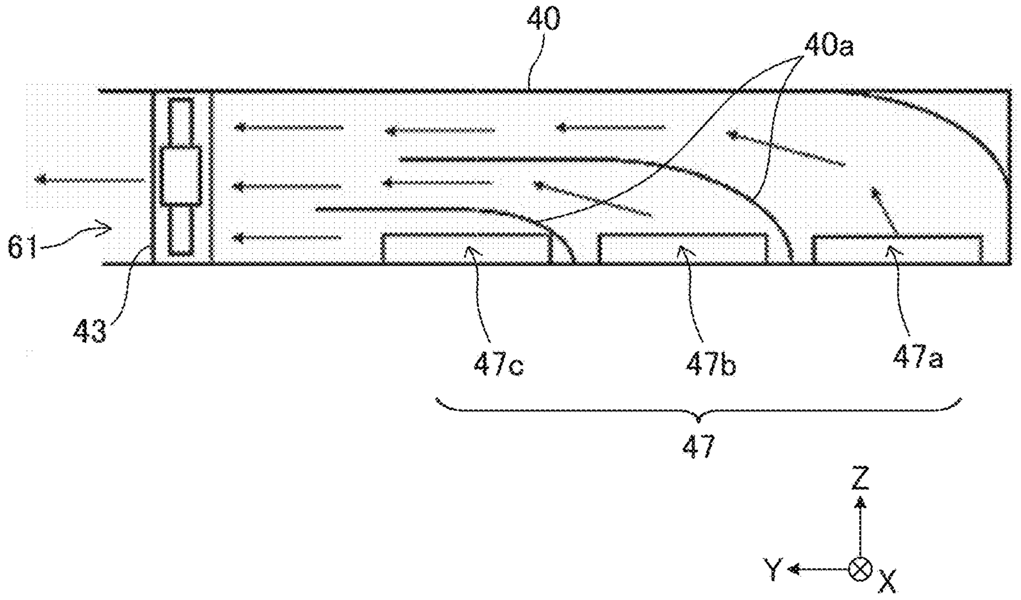
FIG. 10 is a diagram illustrating the second duct.

FIG. 10 is a diagram illustrating the second duct 40.

The shape of the passage in the second duct 40 and the size and number of the second openings 47 of the second duct 40 can be adjusted, which is similar to the first duct 39. By so doing, the amount of air flowing between fixing device 28 and the toner bottle 41 and the amount of exhaust heat caused by the fixing operation can be adjusted. The fixing device 28 applies a slightly larger range of heat in the main scanning direction than the range of the sheet size. When the sheet P passes, heat is taken away by the sheet P. For this reason, the temperature at the center of the sheet P decreases and the temperature at the ends of the sheet P increases. Increasing the amount of air intake from both ends of the second openings 47 (i.e., the second openings 47*a* and 47*c*) of the second duct 40 can efficiently discharge heat and reduce the temperature rise of, for example, the toner bottle 41 or the process unit 12. The amounts of air intake between the adjacent second openings 47 can be adjusted by changing the position of the rib 40*a* that defines the flow passage.

As illustrated in FIGS. 1B, 3, and 9, air is taken by the first fan 42 from the air inlet port 60 provided in the lower part of the housing of the printer 10, passes through the first duct 39, passes between the fixing device 28 and the toner bottle 41, flows through the second duct 40, and is exhausted by the second fan 43 from the air outlet port 61 provided in the upper part of the housing of the printer 10. Flowing the air so as not to flow against the natural convection can efficiently cool the inside of the printer 10, in other words, reduce or prevent the temperature rise.

When the air flows against the air in the present embodiment, in other words, when the fixing device 28 is disposed on the upstream side of the air flowing direction and the process unit 12 is disposed on the downstream side of the air flowing direction (as the descending order of self-heating), the air heated by the fixing device 28 or the heat caused by the fixing operation flows into the process unit 12 to heat the process unit 12. As a result, the temperature rises in an early stage. As a result, by flowing air in the ascending order of self-heating as in the present embodiment, the process unit 12 is cooled and the temperature rise is reduced.

Figure 11:
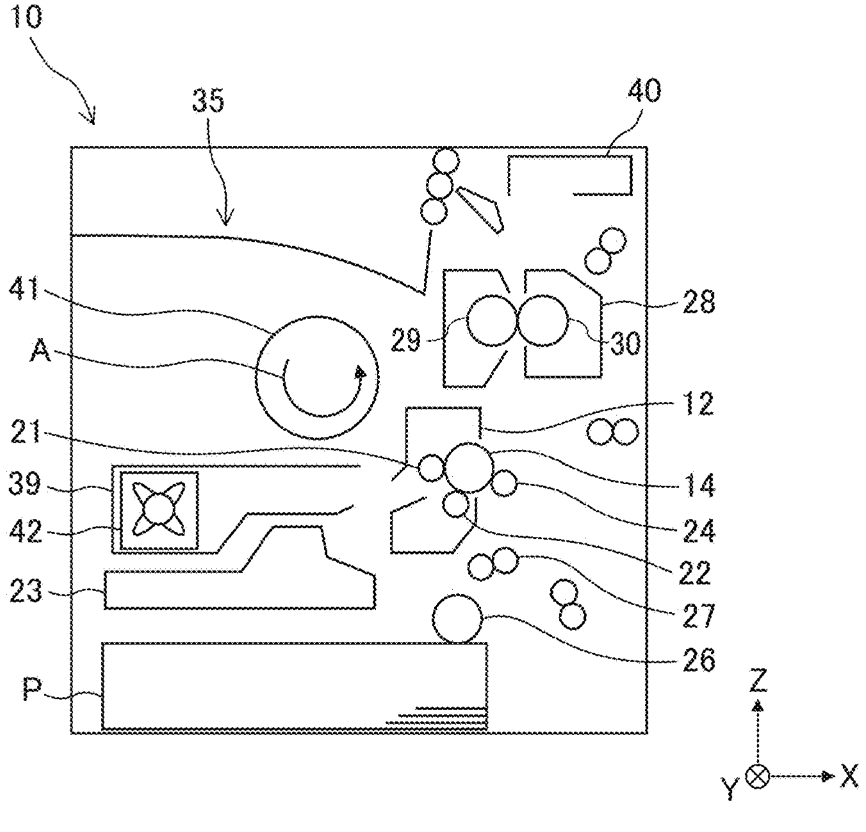
FIG. 11 is a diagram illustrating a toner bottle according to a modification.

FIG. 11 is a diagram illustrating the rotational direction of the toner bottle 41 when the toner bottle 41 rotates.

Figure 12A:
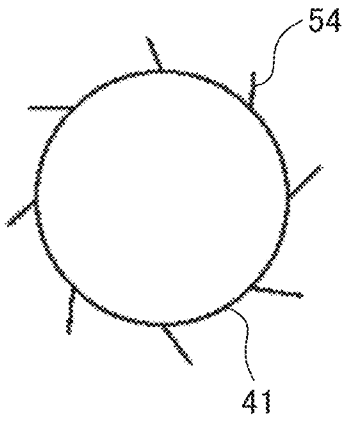
FIG. 12A is a side view of a toner bottle, viewed from the axial direction.

FIG. 12A is a side view of a toner bottle, viewed from the axial direction.

Figure 12B:
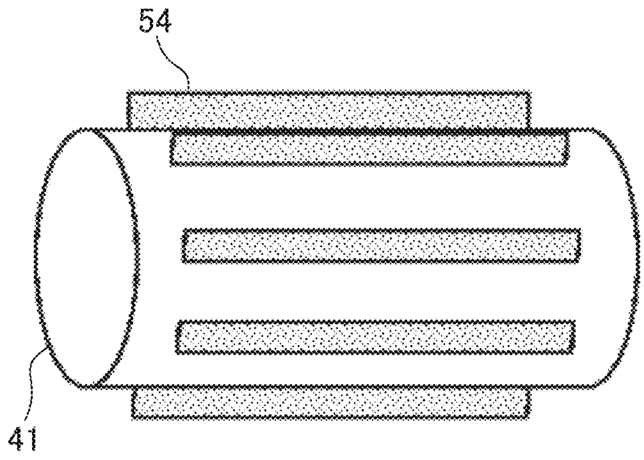
FIG. 12B is a perspective view of the toner bottle of FIG. 12A.

FIG. 12B is a perspective view of the toner bottle of FIG. 12A.

As illustrated in FIG. 11, the toner bottle 41 rotates in the direction indicated by arrow. The toner bottle 41 illustrated in FIGS. 12A and 12B rotates in the counterclockwise direction. Rotating the toner bottle 41 in the same direction as the air flowing direction between the toner bottle 41 and fixing device 28 can reduce the resistance of the air, make the air flow faster, and enhance the heat discharging effect. As illustrated in FIGS. 12A and 12B, the projections 54 (or convex and concave portions) on the outer circumference of the toner bottle 41 can generate air flow using the rotation of the toner bottle 41 in the direction of indicated by arrow A in FIG. 11.

The above-described embodiments are illustrative and do not limit this disclosure. Thus, numerous additional modifications and variations are possible in light of the above teachings. For example, elements and/or features of different illustrative embodiments may be combined with each other and/or substituted for each other within the scope of this disclosure.

The effects described in the embodiments of this disclosure are listed as most preferable effects derived from this disclosure, and therefore are not intended to limit to the embodiments of this disclosure.

Aspect 1

In Aspect 1, an image forming apparatus (for example, the monochrome laser printer 10) includes an image forming device (for example, the process unit 12), a container (for example, the toner bottle 41), a thermal fixing device (for example, the fixing device 28), and a duct (for example, the first duct 39). The image forming device forms an image with an image forming substance (for example, toner). The container separate from the image forming device supplies the image forming substance. The thermal fixing device fixes the image by application of heat and pressure. The duct guides air to flow upward along an outer circumference of the image forming device and an outer circumference of the container.

According to this configuration, the energy efficiency can be enhanced by using the properties of air that naturally moves upward by heat of the thermal fixing device located at a relatively upper part of the image forming apparatus.

Aspect 2

In Aspect 2, in the image forming apparatus according to Aspect 1, one (for example, the process unit 12) of the container (for example, the toner bottle 41) and the image forming device (for example, the process unit 12) has a lower part lower than the thermal fixing device (for example, the fixing device 28), and the duct (for example, the first duct 39) guides air flowing upward along an outer circumference of the one to flow upward between the thermal fixing device and the other (for example, the toner bottle 41) of the container and the image forming device.

According to this configuration, the other is blocked from the heat of the fixing device by the air flowing upward between the thermal fixing device and the other, and the temperature rise of the other can be reduced or prevented.

Aspect 3

In Aspect 3, in the image forming apparatus according to Aspect 2, the other (for example, the toner bottle 41) of the container (for example, the toner bottle 41) and the image forming device (for example, the process unit 12) is disposed adjacent to the thermal fixing device (for example, the fixing device 28).

According to this configuration, the one (for example, the process unit 12) and the other are disposed along the rising air, so that the one and the other can be favorably thermally insulated from the thermal fixing device, and temperature rise of the one and the other can be reduced or prevented.

Aspect 4

In Aspect 4, the image forming apparatus according to Aspect 2 or 3 further includes a heat insulator (for example, the first heat insulation layer 52*a*, the second heat insulation layer 52*b*) between the thermal fixing device (for example, the fixing device 28) and the other (for example, the toner bottle 41) of the container (for example, the toner bottle 41) and the image forming device (for example, the process unit 12).

According to this configuration, the heat of the thermal fixing device to the other can be more satisfactorily insulated.

Aspect 5

In Aspect 5, in the image forming apparatus according to any one of Aspects 2 to 4, the other is the container (for example, the toner bottle 41).

According to this configuration, the other is blocked from the heat of the thermal fixing device (for example, the fixing device 28) by the air flowing upward between the thermal fixing device and the other, and the temperature rise of the other can be reduced or prevented. Accordingly, the image forming substance contained in the container can be protected.

Aspect 6

In Aspect 6, in the image forming apparatus according to Aspect 5, the container (for example, the toner bottle 41) is rotatable, and the container rotates in an upward direction at a portion where a circumferential face of the container contacts the air flowing upward.

According to this configuration, the upward movement of the circumferential face of the container due to the rotations of the container can reduce the resistance to the air flowing upward or accelerate the rise of the air flowing upward, depending on the setting of the rotational driving speed.

Aspect 7

In Aspect 7, in the image forming apparatus according to Aspect 6, the container (for example, the toner bottle 41) has a projection (for example, the projection 54) on the circumferential face to prompt the air flowing upward.

According to this configuration, the projection can contribute to accelerating the rise of the air flowing upward by setting the rotational driving speed.

Aspect 8

In Aspect 8, in the image forming apparatus according to any one of Aspects 2 to 7, the air flowing upward along the outer circumference of the lower part of the one (for example, the process unit 12) of the container (for example, the toner bottle 41) and the image forming device (for example, the process unit 12) branches into air to flow between the thermal fixing device (for example, the fixing device 28) and the other (for example, the toner bottle 41) of the container and the image forming device and air to flow between the thermal fixing device and the one of the container and the image forming device.

According to this configuration, the one is preferably blocked from the heat of the thermal fixing device, and the temperature rise of the one can be reduced or prevented.

Aspect 9

In Aspect 9, in the image forming apparatus according to any one of Aspects 1 to 8, the duct (for example, the first duct 39) includes an air intake member (for example, the first fan 42) on an upstream portion of the duct, and the duct guides the air flowing upward along the outer circumference of the image forming device (for example, the process unit 12) and the outer circumference of the container (for example, the toner bottle 41) to be flown toward an area adjacent to the image forming device and the container.

According to this configuration, since air is forcibly taken in by the air intake member, the air flowing upward can be favorably formed.

Aspect 10

In Aspect 10, in the image forming apparatus according to Aspect 9, the duct (for example, the first duct 39) has multiple outlets (for example, the first openings 46*a*, 46*b*, 46*c*, 46*d*, 46*e*) in a horizontal direction, and end outlets (for example, the first openings 46*a*, 46*e*) of the multiple outlets blow an amount of air greater than an amount of air from an amount of air of center outlets (for example, the first openings 46*b*, 46*c*, 46*d*).

According to this configuration, the end portion of the image forming device is likely to increase in temperature due to the bearing sliding portion and the fixing end portion of the thermal fixing device (for example, the fixing device 28) is also likely to become hot. For these reasons, the temperature rise can be reduced by actively cooling the end portion rather than the center portion.

Aspect 11

In Aspect 11, the image forming apparatus according to any one of Aspects 1 to 10 further includes another duct (for example, the second duct 40), and an exhauster (for example, the second fan 43). Said another duct is separate from the duct and includes an opening (for example, the second openings 47*a*. 47*b*, 47*c*) through which air passing the thermal fixing device is taken. The exhauster is downstream from the opening in an air flowing direction.

According to this configuration, since air is forcibly exhausted by the exhauster, the air flowing upward can be favorably formed.

Aspect 12

In Aspect 12, in the image forming apparatus according to any one of Aspects 1 to 11, the image forming substance is developer.

According to this configuration, any failure caused by melting and softening of the developer due to heat can be avoided.

Aspect 13

In Aspect 13, an image forming apparatus (for example, the monochrome laser printer 10) includes an image forming device (for example, the process unit 12), a container (for example, the toner bottle 41), a thermal fixing device (for example, the fixing device 28), and a duct (for example, the first duct 39). The image forming device forms an image on a sheet with an image forming substance (for example, toner). The container is separate from the image forming device and stores the image forming substance to be supplied to the image forming device. The thermal fixing device applies heat and pressure to the image forming substance to fix the image on the sheet. The duct guides air to flow upward through a first region between an outer circumference of the image forming device and an outer circumference of the container and a second region adjacent to an outer circumference of the thermal fixing device.

Aspect 14

In Aspect 14, in the image forming apparatus according to Aspect 13, at least one of the container (for example, the toner bottle 41) and the image forming device (for example, the process unit 12) has a lower part lower than the thermal fixing device (for example, the fixing device 28), the second region is between an outer circumference of the thermal fixing device and the outer circumference of the container, and the duct (for example, the first duct 39) guides air flowing upward through an outer circumference of the lower part and the second region.

Aspect 15

In Aspect 15, in the image forming apparatus according to Aspect 14, the container (for example, the toner bottle 41) is adjacent to the thermal fixing device (for example, the fixing device 28) in a horizontal direction.

Aspect 16

In Aspect 16, in the image forming apparatus according to Aspect 14 or 15, the image forming device (for example, the process unit 12) is adjacent to and below the thermal fixing device (for example, the fixing device 28).

Aspect 17

In Aspect 17, the image forming apparatus according to any one of Aspects 14 or 15 further includes a heat insulator (for example, the first heat insulation layer 52*a*, the second heat insulation layer 52*b*) between the thermal fixing device (for example, the fixing device 28) and the image forming device (for example, the process unit 12).

Aspect 18

In Aspect 18, the image forming apparatus according to any one of Aspects 14 to 16 further includes a heat insulator (for example, the first heat insulation layer 52*a*, the second heat insulation layer 52*b*) between the thermal fixing device (for example, the fixing device 28) and the container (for example, the toner bottle 41).

Aspect 19

In Aspect 19, the image forming apparatus according to Aspect 18 further includes a heat insulator (for example, the first heat insulation layer 52*a*, the second heat insulation layer 52*b*) between the thermal fixing device (for example, the fixing device 28) and the container (for example, the toner bottle 41). The container is to rotate to increase a speed of the air flowing upward from the first region to the second region.

Aspect 20

In Aspect 20, in the image forming apparatus according to Aspect 19, the container (for example, the toner bottle 41) has a projection (for example, the projection 54) on the circumferential face.

Aspect 21

In Aspect 21, the image forming apparatus according to any one of Aspects 14 to 19 further includes a branch (for example the slope 39*c*) to branch the air flowing upward along the outer circumference of the lower part into air flowing through the second region and air flowing inside the image forming device (for example, the process unit 12).

Aspect 22

In Aspect 22, in the image forming apparatus according to any one of Aspects 13 to 21, the duct (for example, the first duct 39) includes an air suction member (for example, the first fan 42) upstream of the duct in an air flowing direction of the air flowing through the first region and the second region, and the suction member generates the air flowing through the duct toward the first region.

Aspect 23

In Aspect 23, in the image forming apparatus according to Aspect 22, the duct (for example, the first duct 39) has multiple outlets (for example, the first openings 46*a*, 46*b*, 46*c*, 46*d*, 46*e*) arranged in a horizontal direction, and the multiple outlets has end outlets (for example, the first openings 46*a*, 46*e*) at each end of the duct, and center outlets (for example, the first openings 46*b*, 46*c*, 46*d*) between the end outlets (for example, the first openings 46*a*, 46*e*), and a first amount of air blown from the end outlets is greater than a second amount of air blown from the center outlets.

Aspect 24

In Aspect 24, the image forming apparatus according to any one of Aspects 13 to 23 further includes another duct (for example, the second duct 40) disposed upward of the duct (for example, the first duct 39). Said another duct includes an opening (for example, the second openings 47*a*, 47*b*, 47*c*) to take air passing through the thermal fixing device (for example, the fixing device 28), and an exhaust (for example, the second fan 43) downstream from the opening in an air flowing direction of the air flowing through the first region and the second region.

Aspect 25

In Aspect 25, in the image forming apparatus according to any one of Aspects 13 to 24, the image forming substance is developer.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image forming apparatus, comprising:

an image forming device to form an image on a sheet with an image forming substance;

a container separated from the image forming device, the container to store the image forming substance to be supplied to the image forming device;

a thermal fixing device to apply heat and pressure to the image forming substance to fix the image on the sheet; and a duct to guide air to flow upward between an outer circumference of the image forming device and an outer circumference of the container and then adjacent to an outer circumference of the thermal fixing device, wherein the container rotates to increase a speed of the air flowing upward between the outer circumference of the image forming device and the outer circumference of the container and then adjacent to the outer circumference of the thermal fixing device.

2. The image forming apparatus according to claim 1, wherein the duct includes an air suction member upstream of the duct in an air flowing direction of the air flowing upward between the outer circumference of the image forming device and the outer circumference of the container and then adjacent to the outer circumference of the thermal fixing device, and the suction member generates the air flowing through the duct between the outer circumference of the image forming device and the outer circumference of the container.

3. The image forming apparatus according to claim 1, further comprising another duct disposed upward of the duct and including:

an opening to take air passing through the thermal fixing device; and an exhaust downstream from the opening in an air flowing direction of the air flowing upward between the outer circumference of the image forming device and the outer circumference of the container and then adjacent to the outer circumference of the thermal fixing device.

4. The image forming apparatus according to claim 1, wherein the image forming substance is developer.

5. The image forming apparatus according to claim 1, wherein at least one of the container and the image forming device has a lower part lower than the thermal fixing device, the duct guides the air to flow adjacent to the outer circumference of the thermal fixing device and the outer circumference of the container, and the duct guides air flowing upward through:

an outer circumference of the lower part; and then adjacent to the outer circumference of the thermal fixing device.

6. The image forming apparatus according to claim 5, wherein the container is adjacent to the thermal fixing device in a horizontal direction.

7. The image forming apparatus according to claim 5, wherein the image forming device is adjacent to and below the thermal fixing device.

8. The image forming apparatus according to claim 5, further comprising a heat insulator between the thermal fixing device and the image forming device.

9. The image forming apparatus according to claim 5, further comprising a heat insulator between the thermal fixing device and the container.

10. The image forming apparatus according to claim 5, further comprising a branch to branch the air flowing upward along the outer circumference of the lower part into:

air flowing adjacent to the outer circumference of the thermal fixing device; and air flowing between the image forming device and the thermal fixing device.

11. The image forming apparatus according to claim 10, wherein the duct has multiple outlets arranged in a horizontal direction, the multiple outlets has:

end outlets at each end of the duct; and center outlets between the end outlets, and a first amount of air blown from the end outlets is greater than a second amount of air blown from the center outlets.

12. An image forming apparatus, comprising:

an image forming device to form an image on a sheet with an image forming substance;

a container separated from the image forming device, the container to store the image forming substance to be supplied to the image forming device;

a thermal fixing device to apply heat and pressure to the image forming substance to fix the image on the sheet;

a duct to guide air to flow upward between an outer circumference of the image forming device and an outer circumference of the container and then adjacent to an outer circumference of the thermal fixing device; and a heat insulator between the thermal fixing device and the container, wherein at least one of the container and the image forming device has a lower part lower than the thermal fixing device, the duct guides the air to flow adjacent to the outer circumference of the thermal fixing device and the outer circumference of the container, the duct guides air flowing upward through:

an outer circumference of the lower part; and then adjacent to the outer circumference of the thermal fixing device, the container is adjacent to the thermal fixing device in a horizontal direction, and the container rotates to increase a speed of the air flowing upward between the outer circumference of the image forming device and the outer circumference of the container and then adjacent to the outer circumference of the thermal fixing device.

13. The image forming apparatus according to claim 12, wherein the container has a projection on the circumferential face.

* * * * *